United States Patent
Gonzalez Uribe et al.

(10) Patent No.: US 10,793,034 B2
(45) Date of Patent: Oct. 6, 2020

(54) VEHICLE SEAT

(71) Applicant: TOYOTA JIDOSHA KABUSHIKI KAISHA, Aichi (JP)

(72) Inventors: Carlos David Gonzalez Uribe, Susono (JP); Kohshi Katoh, Hadano (JP); Hikaru Sato, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/460,208

(22) Filed: Mar. 15, 2017

(65) Prior Publication Data
US 2017/0267144 A1 Sep. 21, 2017

(30) Foreign Application Priority Data
Mar. 16, 2016 (JP) ................................ 2016-052312

(51) Int. Cl.
| | |
|---|---|
| *B60N 2/68* | (2006.01) |
| *B60N 2/70* | (2006.01) |
| *B60N 2/66* | (2006.01) |
| *B60N 2/64* | (2006.01) |

(52) U.S. Cl.
CPC ............... *B60N 2/68* (2013.01); *B60N 2/643* (2013.01); *B60N 2/66* (2013.01); *B60N 2/682* (2013.01); *B60N 2/686* (2013.01); *B60N 2/7011* (2013.01)

(58) Field of Classification Search
None
See application file for complete search history.

(56) References Cited

U.S. PATENT DOCUMENTS

| | | | | |
|---|---|---|---|---|
| 3,061,374 A | * | 10/1962 | Grosfillex | A47C 3/12 297/440.11 |
| 3,762,769 A | * | 10/1973 | Poschl | A47C 7/462 297/284.4 |
| 4,157,203 A | * | 6/1979 | Ambasz | A47C 7/441 297/285 |
| D274,771 S | * | 7/1984 | Ambasz | D6/375 |
| 5,447,360 A | * | 9/1995 | Hewko | B60N 2/4235 297/216.13 |
| 5,513,897 A | * | 5/1996 | Lemmen | B60N 2/643 297/410 |
| D408,180 S | * | 4/1999 | Ambasz | D6/716 |

(Continued)

FOREIGN PATENT DOCUMENTS

| | | |
|---|---|---|
| JP | 2000-287782 A | 10/2000 |
| JP | 2016-5938 A | 1/2016 |

(Continued)

OTHER PUBLICATIONS

Communication—European Search Report in EP Application No. 17160185.9 dated Jul. 28, 2017.

*Primary Examiner* — Kyle J. Walraed-Sullivan
(74) *Attorney, Agent, or Firm* — Hauptman Ham, LLP (57) ABSTRACT

A vehicle seat includes a seatback. The seatback includes a main frame and a sub-frame suspended from the main frame. The sub-frame is configured to swivel with respect to the main frame. The sub-frame includes a first lateral member, a second lateral member separated from the first lateral member by a distance, and a reinforcement member coupling the first lateral member with the second lateral member.

20 Claims, 9 Drawing Sheets

(56) References Cited

U.S. PATENT DOCUMENTS

| | | | | |
|---|---|---|---|---|
| 5,944,382 | A * | 8/1999 | Ambasz | A47C 7/443 |
| | | | | 297/300.1 |
| 6,125,521 | A * | 10/2000 | Stumpf | A47C 1/03 |
| | | | | 29/446 |
| 6,257,665 | B1 | 7/2001 | Nagamitsu et al. | |
| 7,104,607 | B2 * | 9/2006 | Yasuda | B60N 2/2222 |
| | | | | 297/354.1 |
| D534,384 | S * | 1/2007 | Su | D6/366 |
| 7,845,729 | B2 * | 12/2010 | Yamada | B60N 2/0232 |
| | | | | 297/284.1 |
| 8,899,683 | B2 * | 12/2014 | Ito | B60N 2/1615 |
| | | | | 297/354.11 |
| 9,789,790 | B2 * | 10/2017 | Kondrad | B60N 2/2222 |
| 2005/0127735 | A1 * | 6/2005 | Munsch | B60N 2/686 |
| | | | | 297/391 |
| 2006/0152062 | A1 * | 7/2006 | Archambault | B60N 2/80 |
| | | | | 297/452.34 |
| 2007/0108831 | A1 * | 5/2007 | Ueda | A47C 1/03255 |
| | | | | 297/452.29 |
| 2010/0264708 | A1 * | 10/2010 | Rajaratnam | A47C 1/022 |
| | | | | 297/284.2 |
| 2011/0133531 | A1 * | 6/2011 | Yeh | B60N 2/06 |
| | | | | 297/232 |
| 2011/0181092 | A1 * | 7/2011 | Lin | A47C 7/282 |
| | | | | 297/452.18 |
| 2013/0076092 | A1 | 3/2013 | Kulkarni et al. | |
| 2013/0134753 | A1 * | 5/2013 | Buehlmeyer | B60N 2/38 |
| | | | | 297/284.1 |
| 2013/0175837 | A1 * | 7/2013 | Buehlmeyer | B60N 2/2222 |
| | | | | 297/284.1 |
| 2014/0191550 | A1 * | 7/2014 | Katoh | B60N 2/80 |
| | | | | 297/337 |
| 2014/0203599 | A1 * | 7/2014 | Line | B60N 2/5642 |
| | | | | 297/180.14 |
| 2015/0145303 | A1 * | 5/2015 | Line | B60N 2/643 |
| | | | | 297/283.3 |
| 2015/0239381 | A1 * | 8/2015 | Hamabe | B60N 2/7094 |
| | | | | 297/313 |
| 2015/0266448 | A1 * | 9/2015 | Aoki | B60R 22/20 |
| | | | | 297/313 |
| 2015/0343924 | A1 * | 12/2015 | Takeuchi | B60N 2/39 |
| | | | | 297/314 |
| 2015/0367756 | A1 | 12/2015 | Katoh et al. | |
| 2016/0121761 | A1 * | 5/2016 | Nishide | B60N 2/2222 |
| | | | | 297/284.3 |
| 2016/0159254 | A1 * | 6/2016 | Katoh | A47C 1/024 |
| | | | | 297/313 |
| 2016/0257230 | A1 * | 9/2016 | Tsuji | B60N 2/64 |
| 2017/0320418 | A1 * | 11/2017 | Madrigal | B60N 2/803 |
| 2018/0022238 | A1 * | 1/2018 | Gonzalez Uribe | B60N 2/10 |
| | | | | 297/325 |
| 2018/0072187 | A1 * | 3/2018 | Katoh | B60N 2/39 |

FOREIGN PATENT DOCUMENTS

| | | |
|---|---|---|
| SG | 186738 A1 | 2/2013 |
| WO | 2012/099060 A1 | 7/2012 |
| WO | 2013-021497 A1 | 2/2013 |

* cited by examiner

VEHICLE SEAT

CROSS REFERENCE TO RELATED APPLICATIONS

The present application claims the benefit of priority to Japanese Patent Application No. 2016-052312 filed on Mar. 16, 2016 with the Japanese Patent Office, the entire contents of which are incorporated herein by reference in its entirety.

BACKGROUND

Some vehicle seats include a seatback for supporting a back of a vehicle occupant. Diagonal loads often cause the seatback to be deformed by a diagonal load.

SUMMARY

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

An aspect of this description is related to a vehicle seat, comprising a seatback. The seatback comprises a main frame and a sub-frame suspended from the main frame. The sub-frame is configured to swivel with respect to the main frame. The sub-frame comprises a first lateral member, a second lateral member separated from the first lateral member by a distance, and a reinforcement member coupling the first lateral member with the second lateral member.

Another aspect of this description is related to a vehicle seat, comprising a seatback. The seatback comprises a main frame and a sub-frame suspended from the main frame. The sub-frame is configured to swivel with respect to the main frame. The sub-frame comprises a first lateral member, a second lateral member separated from the first lateral member by a distance, and a reinforcement member coupling the first lateral member with the second lateral member. The seatback also comprises a net member coupled with the first lateral member and the second lateral member of the sub-frame. The net member and the reinforcement member are configured to maintain a predetermined clearance between the net member and the reinforcement member.

Another aspect of this description is related to a vehicle seat, comprising a seatback. The seatback comprises a main frame and a sub-frame suspended from the main frame. The sub-frame is configured to swivel with respect to the main frame. The sub-frame comprises a first lateral member, a second lateral member separated from the first lateral member by a distance, and a reinforcement member coupling the first lateral member with the second lateral member. The reinforcement member is joined with the first lateral member at a plurality of first points, and with the second lateral member at a plurality of second points.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
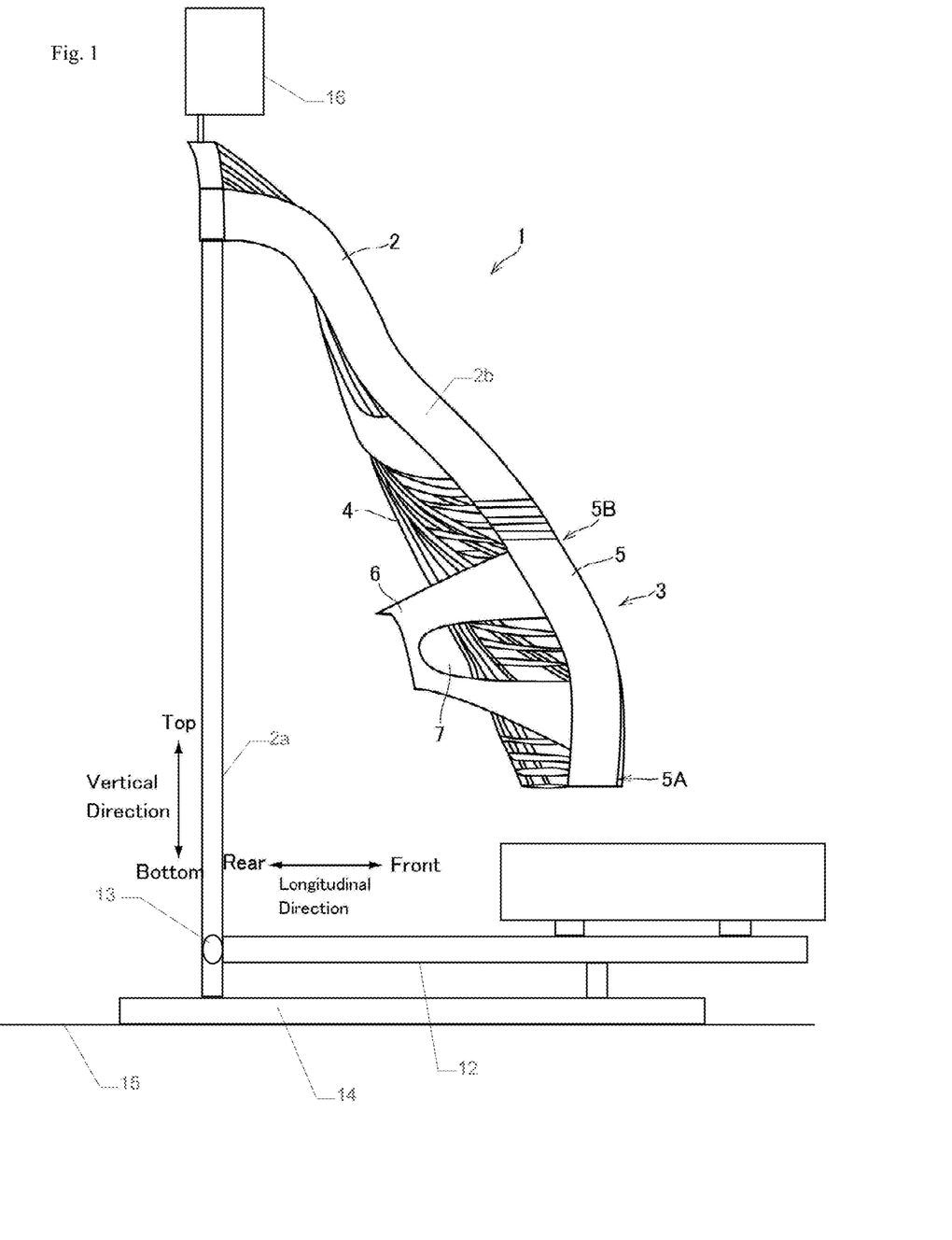
FIG. 1 is a side view of a seatback having sub-frame, in accordance with some embodiments.

FIG. 1 is a side view of seatback having a sub-frame, in accordance with some embodiments. Seatback 1 is configured to support a vehicle seat occupant. In some embodiments, a vehicle seat comprising the seatback 1 is a front passenger seat, a driver seat, a middle front passenger seat, a rear passenger seat, a third-row passenger seat, a child passenger seat, or some other suitable set for accommodating a passenger in a vehicle.

The seatback 1 comprises a main frame 2 and a sub-frame 3. In some embodiments, the main frame 2 is a fixed frame. In some embodiments, the main frame 2 is a frame capable of moving with respect to some other object included in a vehicle, or attached thereto. The sub-frame 3 is suspended from the main frame 2. In some embodiments, the sub-frame 3 is configured to pivot with respect to main frame 2. In some embodiments, sub-frame 3 is coupled with main frame 2 by a swivel-coupling and an outer periphery support such that the sub-frame 3 is capable of swiveling with respect to the main frame 2. In some embodiments, a right upper corner and a left upper corner of the sub-frame 3 are individually connected to the main frame 2 through an outer periphery support.

The main frame 2 is over the sub-frame 3 such that the main frame 2 is arranged at a upper-side of the seatback 1 and the sub-frame 4 is positioned at a lower-side of seatback 1. The seatback 1 is configured such that is an occupant is seated on a seat portion of the vehicle seat (not shown) proximate to the seatback 1, the main frame 2 is positioned at a level of the seatback 1 for supporting a shoulder blade of the seated occupant, and the sub-frame 3 is positioned at a level of the seatback 1 for supporting a lumbosacral area of the seated occupant. In some embodiments, the main frame 2 and the sub-frame 3 are curved in a shape that matches, or at least substantially matches, a back contour of the seated occupant from the occupant's shoulders to the occupant's hips.

A net member 4 is attached to the seatback 1 by way of the main frame 2 and the sub-frame 3. In some embodiments, net member 4 is configured to flexibly support the shoulder blades and a lumbar spine of the seated occupant. In some embodiments, the net member 4 is a support member having materials arranged in a predetermined pattern. In some embodiments, net member 4 is a support member having materials arranged to form a mesh. In some embodiments, net member 4 comprises flexible and contractible warp threads and weft threads.

In some embodiments, the main frame 2 is configured to be coupled with a seat frame 12 through a recliner mechanism 13. In some embodiments, the main frame 2 comprises a lower portion 2a that is configured to be slidably engaged with guiderails 14 extending on a floor 15 of a vehicle in which the vehicle seat 1 is configured to be installed, wherein the guiderails 14 extend in a longitudinal direction of the vehicle from front to back. In some embodiments, the main frame 2 comprises an upper portion 2b configured to be coupled with a headrest 16 for supporting a head of the seated occupant.

In some embodiments, the seatback 1 is free from having connectivity or association with a seat portion, and the seatback is configured to support a back of a standing occupant of the vehicle.

Figure 2:
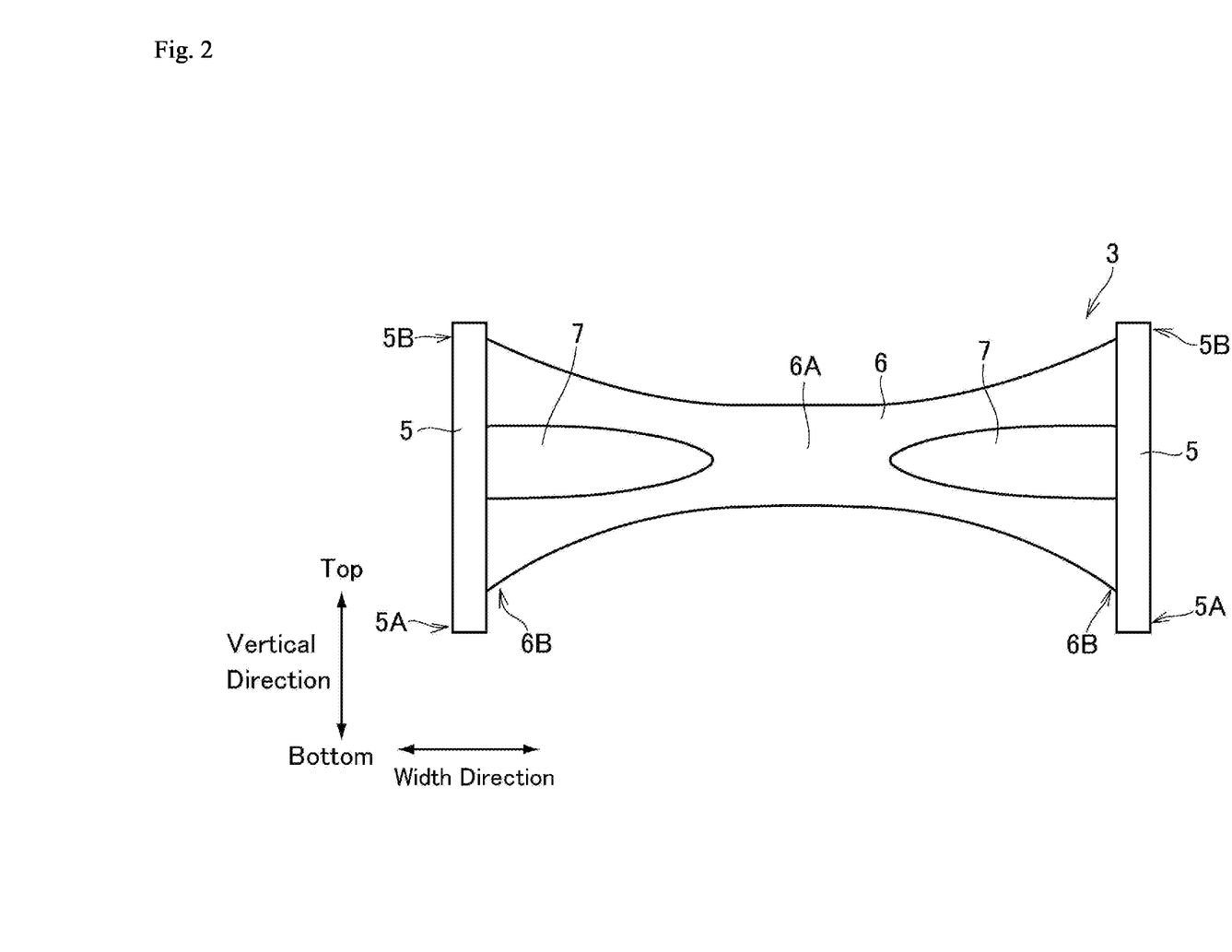
FIG. 2 is a front view of a sub-frame, in accordance with some embodiments.

FIG. 2 is a front view of a sub-frame, in accordance with some embodiments. The sub-frame 3 comprises a pair of lateral members 5 extending vertically on both right and left sides of the sub-frame 3, and a reinforcement member 6 coupling the lateral members 5. The lateral members 5 are individually curved in the longitudinal direction of the vehicle (see FIGS. 1 and 3) along the contour of the lumbar spine of the occupant. The lateral members 5 are configured having heights such that the sub-frame 3 is configured to support the lumbar spine of the occupant.

The reinforcement member 6 is a plate member extending between the lateral members 5. In some embodiments, the reinforcement member 6 is a band member extending between the lateral members 5. In some embodiments, the reinforcement member 6 has a depressed-shape such that a width of the reinforcement member 6 is gradually reduced from both right and left end portions 6B toward a center portion 6A. In some embodiments, the reinforcement member 6 is shaped such that the reinforcement member 6 has a semi-elliptical side hole 7 defined by the end portions 6B and the center portion 6A. In some embodiments, a curved-portion of the semi-elliptical side hole 7 is on a center portion side of the semi-elliptical side hole 7. In some embodiments, the reinforcement member 6 is X-shaped, wherein a lower end portion of each end portion 6B is individually joined to a vicinity of a lower end 5A of the corresponding lateral member 5, and an upper end portion of each end portion 6B is individually joined to a vicinity of an upper end 5B of the corresponding lateral member 5. In some embodiments, each lower end of each end portion 6B of the reinforcement member 6 is joined to the corresponding lateral member 5 at a portion slightly higher than the lower end 5A of the respective end portion 6B.

The reinforcement member 6 comprises a fiber-glass reinforced plastic, a fiber-reinforced composite material or some other suitable material. In some embodiments, the reinforcement member 6 is manufactured by an injection molding process. In some embodiments, the reinforcement member 6 is manufactured by setting a predetermined fiber material, closing a mold, and injecting a synthetic resin material into the mold.

Figure 3:
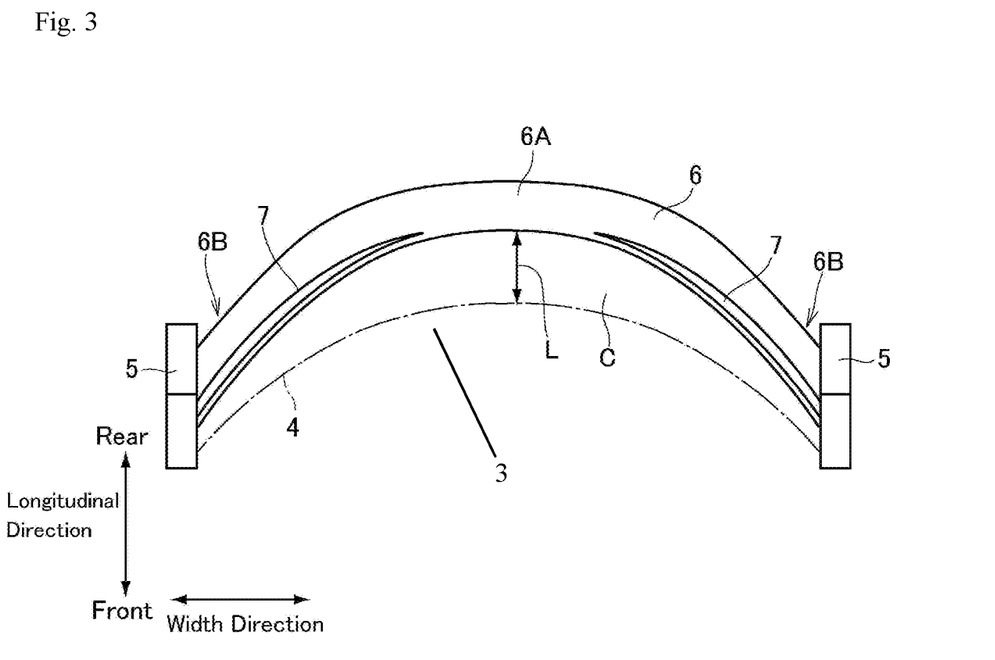
FIG. 3 is a side view of a sub-frame, in accordance with some embodiments.

FIG. 3 is a side view of a sub-frame, in accordance with some embodiments. In FIG. 3, the center portion 6A of the reinforcement member 6 is curved backwardly to be situated behind the lateral members 5 in a longitudinal direction extending from a front side of the sub-frame to a back side of the sub-frame 3. In some embodiments, the longitudinal direction corresponds to a direction extending from a front side to a back side of a vehicle in which a vehicle seat having the sub-frame 3 is installed. In some embodiments, a vehicle seat including the sub-frame 3 is configured to be installed in a vehicle such that the front side of the sub-frame 3 faces a front side of the vehicle. In some embodiments, a vehicle seat including the sub-frame 3 is configured to be installed in a vehicle such that the front side of the sub-frame 3 faces a back side of the vehicle.

The lateral members 5 have a width in the front to rear direction, and a center portion. In some embodiments, the reinforcement member 6 is coupled with the lateral members 5 such that an entirety of the reinforcement member 6 is positioned rearward of the center portion in the longitudinal direction. In some embodiments, the reinforcement member 6 is coupled with the lateral members 5 such that less than an entirety of the reinforcement member 6 is positioned rearward of the center portion in the longitudinal direction. In some embodiments, the reinforcement member 6 has a constant width in the longitudinal direction. In some embodiments, the reinforcement member 6 has a variable width in the longitudinal direction. In some embodiments, the reinforcement member 6 is coupled with the lateral members 5 such that a portion of the reinforcement member 6 having the greatest width is positioned rearward of the center portion in the longitudinal direction. In some embodiments, the reinforcement member 6 is coupled with the lateral members 5 such that a portion of the reinforcement member 6 having the greatest width is positioned rearward of the lateral members 5 in the longitudinal direction.

Figure 4:
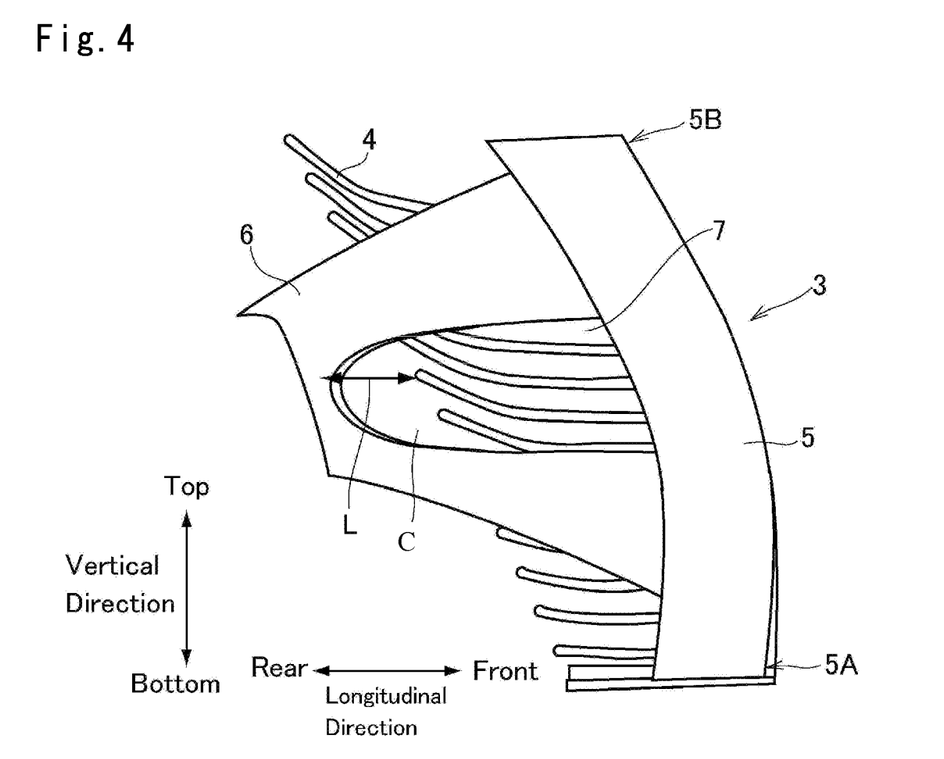
FIG. 4 is a partial side view of a sub-frame to which a net member is attached, in accordance with some embodiments.
Figure 5:
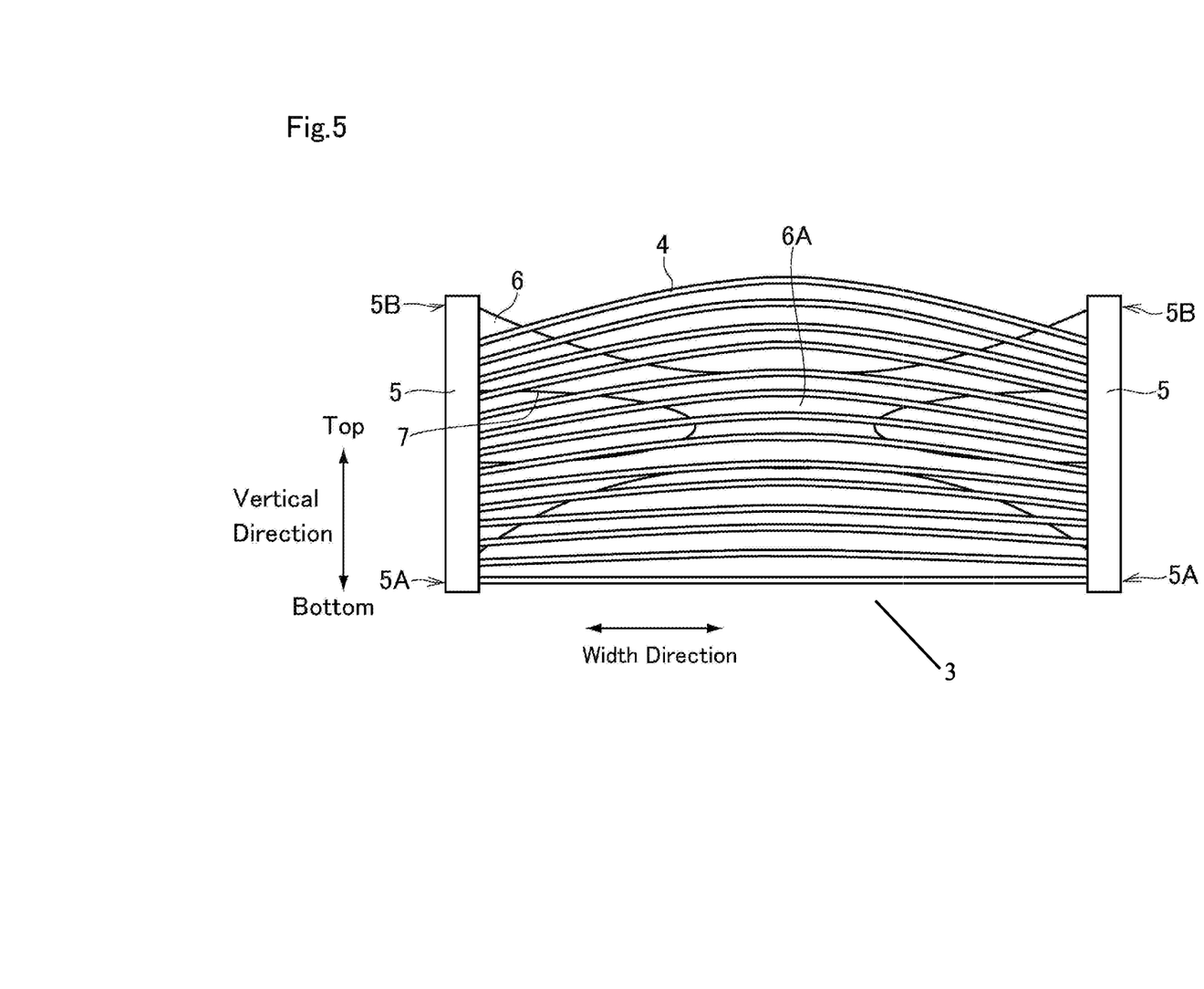
FIG. 5 is a front view of a net member attached to a sub-frame, in accordance with some embodiments.
Figure 6:
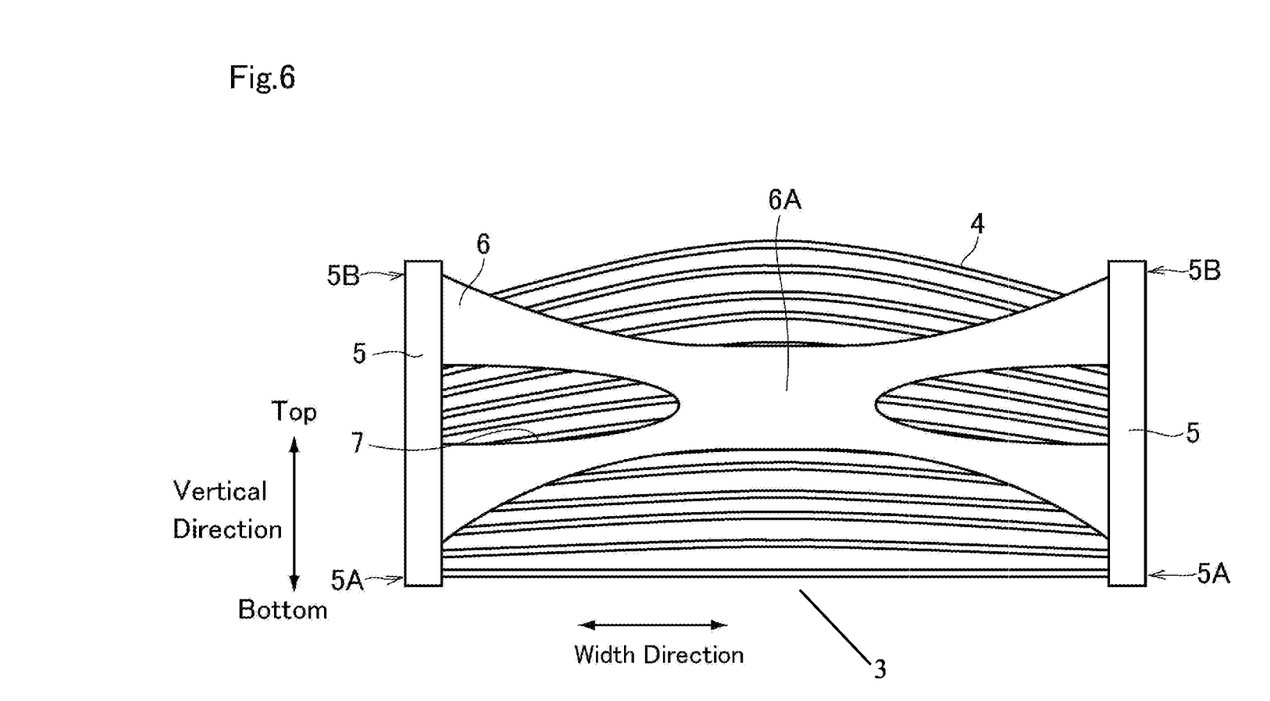
FIG. 6 is a rear view of a net member attached to a sub-frame, in accordance with some embodiments.

FIG. 4 is a partial side view of a sub-frame to which a net member is attached, in accordance with some embodiments. FIG. 5 is a partial front view of a net member attached to a sub-frame, in accordance with some embodiments. FIG. 6 is a partial rear view of a net member attached to a sub-frame, in accordance with some embodiments.

In FIGS. 4-6, the warp threads of the net member 4 are omitted for ease of understanding. The sub-frame 3, having the net member 4 attached thereto, is configured such that a predetermined clearance C is maintained between the net member 4 and the reinforcement member 6, and a shortest distance L between the net member 4 and the reinforcement member 6 is determined experimentally in such a manner that the net member 4 pushed backwardly by the occupant will not be brought into contact to the reinforcement member 6 even in the event of a rear-end collision. (see FIG. 4).

A vehicle seat having a sub-frame 3, is configured to support a vehicle occupant. In some embodiments, if a driver sitting on the vehicle seat having the sub-frame 3, turns a steering wheel of a vehicle within which the vehicle seat having the sub-frame 3 is installed, a chest of the driver is twisted and the sub-frame 3 is swayed by the twisting motion of the driver. In this situation, the sub-frame 3 is subjected to a deformation load resulting from a weight shift of the driver. The reinforcement member 6 supports the lateral members 5 at the lower ends 5A and the upper ends 5B, and enhances the rigidity or strength of the sub-frame 3 to prevent deformation of the sub-frame 3. Additionally, the rigidity of the lower portion of the sub-frame 3 supporting the lumbosacral area of the driver is enhanced, and the sub-frame 3 is allowed to swivel in accordance with the twisting motion of the driver.

The clearance C that is maintained between the net member 4 and the reinforcement member 6 prevents a conflict between the lumbar spine of the occupant and the reinforcement member 6, which helps to improve occupant comfort. Additionally, because the net member 4 will not be brought into contact to the reinforcement member 6 in the event of a rear-end collision, the sub-frame 3 helps to improve occupant safety. Furthermore, because the net member 4 will not be brought into contact to the reinforcement member 6, the reinforcement member 6 helps protect an occupant from an object behind the vehicle seat in the event of a collision. For example, a vehicle seat having the sub-frame 3 is installed in a forward portion of a passenger compartment of a vehicle, and a child safety seat is installed on a back seat of the vehicle behind the vehicle seat having the sub-frame 3, the occupant the reinforcement member 6 protects the occupant from the child safety seat colliding against the reinforcement member 6 from behind in the event of a rear-end collision.

Figure 7:
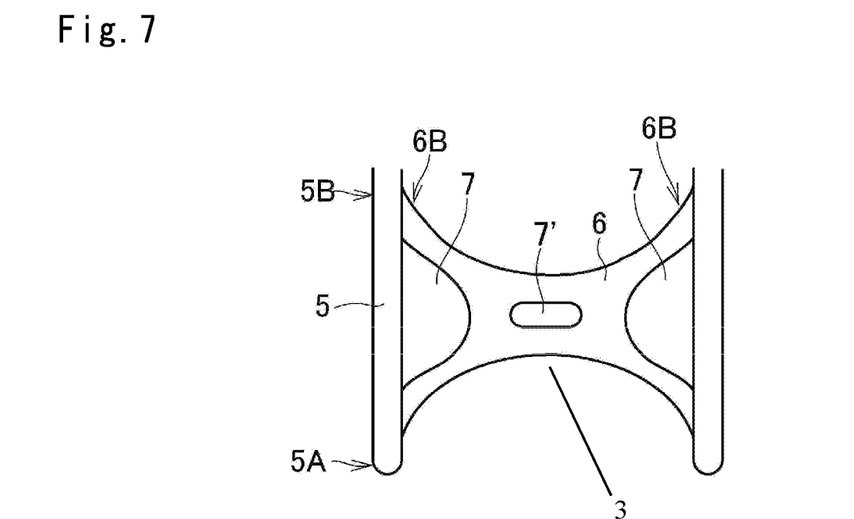
FIG. 7 is a front view of a sub-frame, in accordance with some embodiments.

FIG. 7 is a front view of a sub-frame, in accordance with some embodiments. The sub-frame 3 in FIG. 7 is similar to that discussed with respect to FIGS. 1-6. Detailed explanations for the common elements are omitted for readability. In FIG. 7, the center portion 6A is configured to define an elliptical center hole 7' in addition to the side holes 7. The additional hole 7' helps to reduce an amount of material included in the reinforcement member 6. A reduction in material helps to reduce manufacturing costs and weight of the reinforcement member 6.

Figure 8:
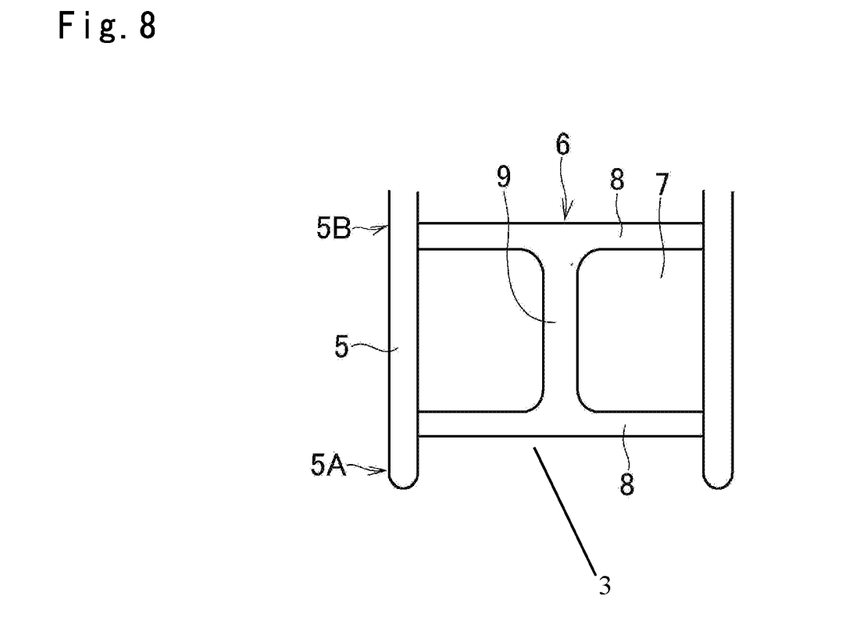
FIG. 8 is a front view of a sub-frame, in accordance with some embodiments.

FIG. 8 is a front view of a sub-frame, in accordance with some embodiments. The sub-frame 3 in FIG. 8 is similar to that discussed with respect to FIGS. 1-6. Detailed explanations for the common elements are omitted for readability. The reinforcement member 6 comprises a pair of horizontal beams 8 extending parallel to each other between the lateral members 5 and a vertical beam 9 connecting center portions of the horizontal beams 8. Each end portion of a lower horizontal beam 8 is individually joined to the vicinity of the lower ends 5A of the lateral members 5, and each end portion of an upper horizontal beam 8 is individually joined to the vicinity of the upper ends 5B of the lateral members 5. Each of the side holes 7 is individually enlarged, which helps to reduce an amount of material included in the reinforcement member 6. A reduction in material helps to reduce manufacturing costs and weight of the reinforcement member 6.

Figure 9:
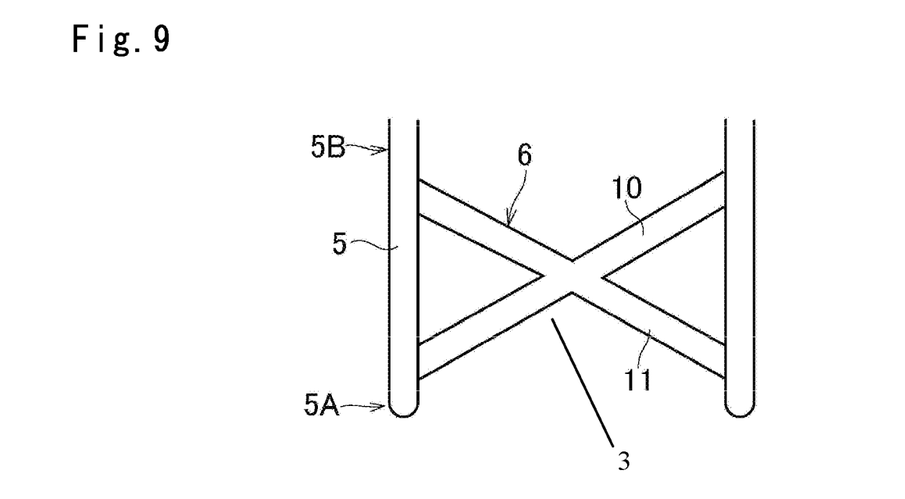
FIG. 9 is a front view of a sub-frame, in accordance with some embodiments.

FIG. 9 is a front view of a sub-frame, in accordance with some embodiments. The sub-frame 3 in FIG. 9 is similar to that discussed with respect to FIGS. 1-6. Detailed explanations for the common elements are omitted for readability. The reinforcement member 6 comprises a first diagonal beam 10 extending between the lower end 5A of one of the lateral members 5 and the upper end 5B of the other lateral member 5, and a second diagonal beam 11 extending between the lower end 5A of said other lateral member 5 and the upper end 5B of said one of the lateral members 5. In some embodiments, the first diagonal beam 10 and the second diagonal beam 11 are integrated at an intersection point. In some embodiments, inclusion of the first diagonal beam 10 and the second diagonal beam 11 simplifies the construction of the reinforcement member 6.

Figure 10:
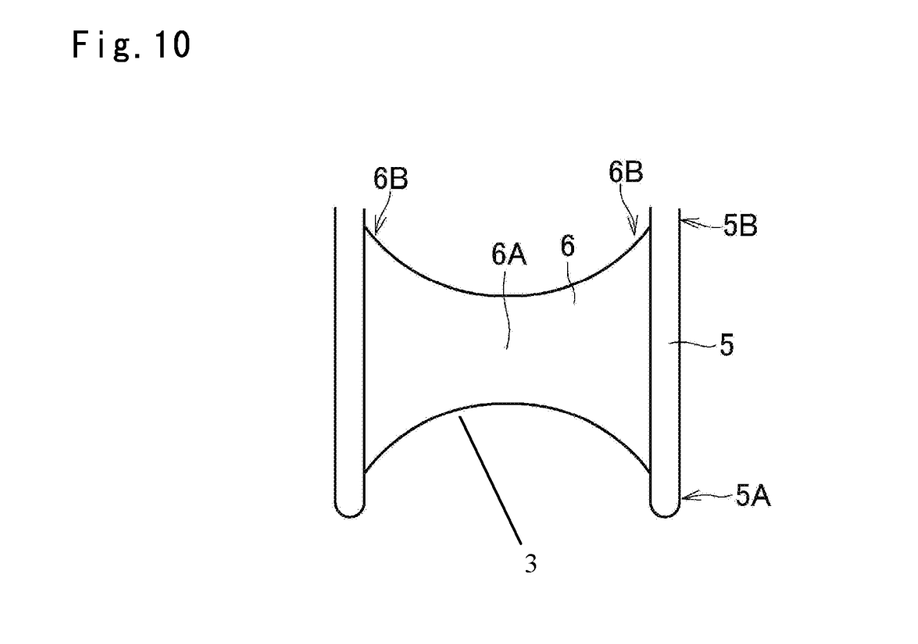
FIG. 10 is a front view of a sub-frame, in accordance with some embodiments.

FIG. 10 is a front view of a sub-frame, in accordance with some embodiments. The sub-frame 3 in FIG. 10 is similar to that discussed with respect to FIGS. 1-6. Detailed explanations for the common elements are omitted for readability. In FIG. 10, the reinforcement member 6 is free from including side holes 7 and the center hole 7'. Both right and left end portions 6B of the reinforcement member 6 are joined entirely to the lateral members 5 from the vicinity of the lower end 5A to the vicinity of an upper end 5B. That is, lateral faces of the reinforcement member 6 are totally contacted to the lateral members 5. The center portion 6A of the reinforcement member 6 is depressed upwardly and downwardly such that a width of the reinforcement member 6 is gradually reduced from both right and left end portions 6B toward the center portion 6A. In some embodiments, the omission of the side holes 7 and/or the center hole 7' helps to enhance rigidity of the sub-frame 3 to prevent deformation.

Figure 11:
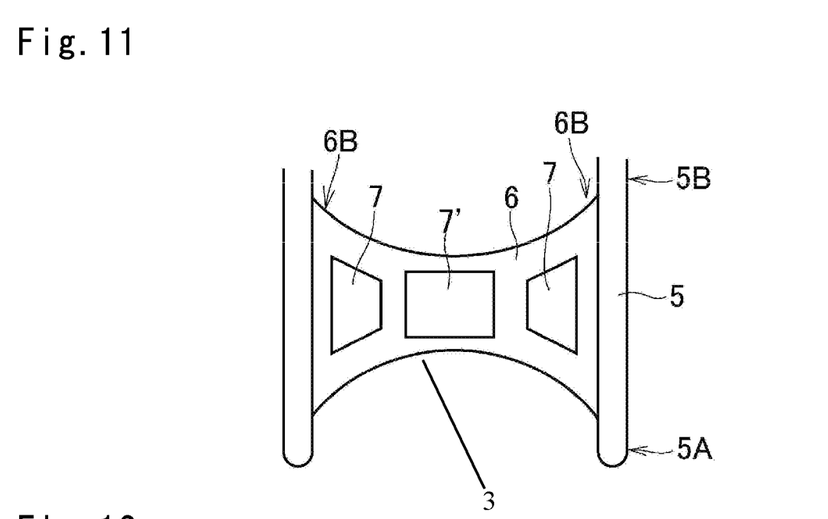
FIG. 11 is a front view of a sub-frame, in accordance with some embodiments.

FIG. 11 is a front view of a sub-frame, in accordance with some embodiments. The sub-frame 3 in FIG. 11 is similar to that discussed with respect to FIGS. 1-6. Detailed explanations for the common elements are omitted for readability. In FIG. 11, the reinforcement member 6 is configured to define a rectangular center hole 7' is on the center portion 6A, and trapezoidal side holes 7 on both sides of the center hole 7'. Both right and left end portions 6B of the reinforcement member 6 are joined entirely to the lateral members 5 from the vicinity of the lower end 5A to the vicinity of an upper end 5B. That is, lateral faces of the reinforcement member 6 are totally contacted to the lateral members 5. The center portion 6A of the reinforcement member 6 is depressed upwardly and downwardly such that a width of the reinforcement member 6 is gradually reduced from both right and left end portions 6B toward the center portion 6A.

In some embodiments, the rectangular center hole 7' and the trapezoidal side holes 7 help to reduce an amount of material included in the reinforcement member 6. The reduction in material included in the reinforcement member 6 helps to reduce the weight of the reinforcement member 6 and the manufacturing costs of the reinforcement member 6. In some embodiments, rigidity of the reinforcement member 6 is enhanced by having the right and left end portions 6B of the reinforcement member 6 joined entirely to the lateral members 5.

Figure 12:
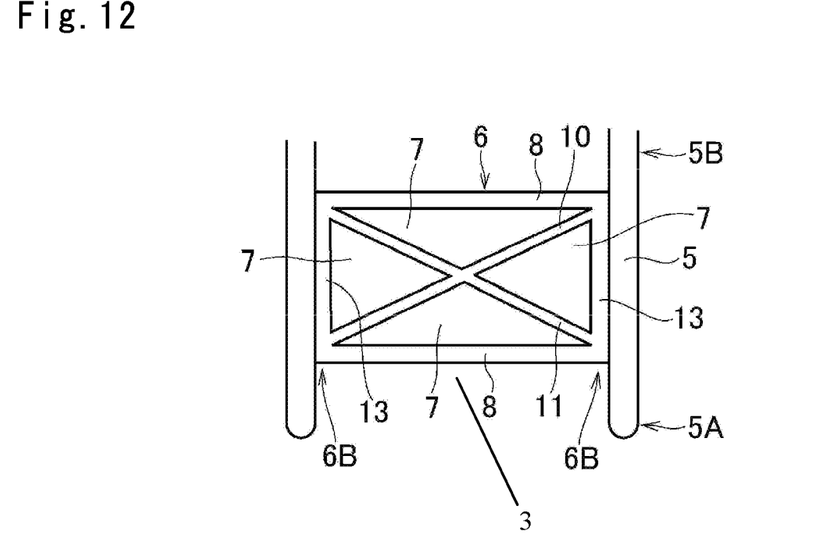
FIG. 12 is a front view of a sub-frame, in accordance with some embodiments.

FIG. 12 is a front view of a sub-frame, in accordance with some embodiments. The sub-frame 3 in FIG. 12 is similar to that discussed with respect to FIGS. 1-6. Detailed explanations for the common elements are omitted for readability. In FIG. 12, the reinforcement member 6 comprises a pair of horizontal beams 8, a pair of vertical beams 13, a first diagonal beam 10, and a second diagonal beam 11. Both right and left end portions 6B of the vertical beams 13 are joined entirely to the lateral members 5, and upper ends of the vertical beams 13 and lower ends of the vertical beams 13 are connected through the horizontal beams 8 extending parallel to each other. The first diagonal beam 10 extends between the lower end 5A of one of the lateral members 5 and the upper end 5B of the other lateral member 5, and the second diagonal beam 11 extends between the lower end 5A of said other lateral member 5 and the upper end 5B of said one of the lateral members 5. In some embodiments, the side holes 7 are enlarged compared to other embodiments, which reduces an amount of material included in the reinforcement member 6. The reduction in material included in the reinforcement member 6 helps to reduce the weight of the reinforcement member 6 and the manufacturing costs of the reinforcement member 6. In some embodiments, rigidity of the reinforcement member 6 is enhanced by having the right and left end portions 6B of the reinforcement member 6 joined entirely to the lateral members 5.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vehicle seat, comprising:
    a seatback, comprising:
        a main frame, comprising:
            a lower portion configured to be slidably engaged with a guiderail extending on a floor of a vehicle in a longitudinal direction extending from a front side of the vehicle to a rear side of the vehicle; and
            an upper portion positioned at a level of the seatback for supporting a shoulder blade of a vehicle occupant;
        a head rest coupled with the upper portion of the main frame for supporting a head of the vehicle occupant; and
        a sub-frame suspended from and coupled with the upper portion of the main frame and positioned such that the sub-frame is below the upper portion of the main frame at a level of the seatback for supporting a lumbosacral area of the vehicle occupant, the sub-frame comprising:
            a first lateral member extending in a substantially vertical direction;
            a second lateral member extending in the substantially vertical direction, the second lateral member being a separate and distinct element from the first lateral member, separated from the first lateral member by a distance in a width direction such that the second lateral member is free from direct physical contact with the first lateral member; and
            a reinforcement member coupling the first lateral member with the second lateral member, wherein
        the reinforcement member is at least partially situated behind the first lateral member and the second lateral member in the longitudinal direction, and
        the sub-frame is coupled with the upper portion of the main frame such that the sub-frame is configured to swivel with respect to the upper portion of the main frame in a direction corresponding to a twisting motion of the vehicle occupant.

2. The vehicle seat of claim 1, wherein
    the reinforcement member comprises a plate member having a front side, a back side opposite the front side, a first lateral end, and a second lateral end opposite the first lateral end,
    the reinforcement member is curved backwardly in the longitudinal direction,
    the first lateral end of the reinforcement member is joined with the first lateral member at a plurality of first points, and
    the second lateral end of the reinforcement member is joined with the second lateral member at a plurality of second points.

3. The vehicle seat of claim 2, wherein
    the first lateral member has a first upper end and a first lower end opposite the first upper end, the first upper end being closer to the upper portion of the main frame than the first lower end,
    the second lateral member has a second upper end and a second lower end opposite the second upper end, the second upper end being closer to the upper portion of the main frame than the second lower end, and
    the reinforcement member is coupled with the first lateral member and with the second lateral member such that the reinforcement member is closer to the first upper end of the first lateral member and the second upper end of the second lateral member than to the first lower end of the first lateral member and the second lower end of the second lateral member.

4. The vehicle seat of claim 3, comprising:
    a support member coupled with the first lateral member and the second lateral member of the sub-frame, the support member being configured to contact the lumbosacral area of the vehicle occupant,
    wherein the support member and the reinforcement member are configured to maintain a predetermined clearance between the support member and the reinforcement member.

5. The vehicle seat of claim 2, comprising:
    a support member coupled with the first lateral member and the second lateral member of the sub-frame, the support member being configured to contact the lumbosacral area of the vehicle occupant,
    wherein the support member and the reinforcement member are configured to maintain a predetermined clearance between the support member and the reinforcement member.

6. The vehicle seat of claim 1, wherein
    the first lateral member has a first upper end and a first lower end opposite the first upper end, the first upper end being closer to the upper portion of the main frame than the first lower end,
    the second lateral member has a second upper end and a second lower end opposite the second upper end, the second upper end being closer to the upper portion of the main frame than the second lower end, and
    the reinforcement member is coupled with the first lateral member and with the second lateral member such that the reinforcement member is closer to the first upper end of the first lateral member and the second upper end of the second lateral member than to the first lower end of the first lateral member and the second lower end of the second lateral member.

7. The vehicle seat of claim 6, comprising:
a support member coupled with the first lateral member and the second lateral member of the sub-frame, the support member being configured to contact the lumbosacral area of the vehicle occupant,
wherein the support member and the reinforcement member are configured to maintain a predetermined clearance between the support member and the reinforcement member.

8. The vehicle seat as claimed in claim 1, comprising:
a support member coupled with the first lateral member and the second lateral member of the sub-frame, the support member being configured to contact the lumbosacral area of the vehicle occupant,
wherein the support member and the reinforcement member are configured to maintain a predetermined clearance between the support member and the reinforcement member.

9. The vehicle seat as claimed in claim 8, wherein the support member comprises a mesh material.

10. The vehicle seat as claimed in claim 8, wherein the support member comprises warp threads and weft threads.

11. The vehicle seat as claimed in claim 1, wherein the sub-frame is coupled with the upper portion of the main frame by a swivel-coupling and an outer periphery support.

12. The vehicle seat as claimed in claim 1, wherein the reinforcement member is shaped having at least one semi-elliptical hole defined therein.

13. The vehicle seat as claimed in claim 12, wherein a curved-portion of the semi-elliptical hole is on a side of the semi-elliptical hole opposite the first lateral member.

14. The vehicle seat as claimed in claim 12, wherein a curved-portion of the semi-elliptical hole is on a side of the semi-elliptical hole opposite the second lateral member.

15. The vehicle seat as claimed in claim 1, wherein the reinforcement member is X-shaped.

16. The vehicle seat as claimed in claim 1, wherein the reinforcement member is shaped having at least one rectangular hole defined therein.

17. A vehicle seat, comprising:
a seatback, comprising:
a main frame, comprising:
a lower portion configured to be slidably engaged with a guiderail extending on a floor of a vehicle in a longitudinal direction extending from a front side of the vehicle to a rear side of the vehicle; and
an upper portion positioned at a level of the seatback for supporting a shoulder blade of a vehicle occupant;
a head rest coupled with the upper portion of the main frame for supporting a head of the vehicle occupant; and
a sub-frame suspended from and coupled with the upper portion of the main frame and positioned such that the sub-frame is below the upper portion of the main frame at a level of the seatback for supporting a lumbosacral area of the vehicle occupant, the sub-frame comprising:
a first lateral member extending in a substantially vertical direction;
a second lateral member extending in the substantially vertical direction, the second lateral member being a separate and distinct element from the first lateral member, separated from the first lateral member by a distance in a width direction such that the second lateral member is free from direct physical contact with the first lateral member; and
a reinforcement member coupling the first lateral member with the second lateral member; and
a net member coupled with the first lateral member and the second lateral member of the sub-frame,
wherein
the sub-frame is coupled with the upper portion of the main frame such that the sub-frame is configured to swivel with respect to the upper portion of the main frame in a direction corresponding to a twisting motion of the vehicle occupant, and
the net member and the reinforcement member are configured to maintain a predetermined clearance between the net member and the reinforcement member.

18. The vehicle seat claimed in claim 17, wherein the reinforcement member is at least partially situated behind the first lateral member and the second lateral member in the longitudinal direction.

19. The vehicle seat of claim 17, wherein
the reinforcement member comprises a plate member having a front side, a back side opposite the front side, a first lateral end, and a second lateral end opposite the first lateral end, and
the reinforcement member is curved backwardly in the longitudinal direction.

20. A vehicle seat, comprising:
a seatback, comprising:
a main frame, comprising:
a lower portion configured to be slidably engaged with a guiderail extending on a floor of a vehicle in a longitudinal direction extending from a front side of the vehicle to a rear side of the vehicle; and
an upper portion positioned at a level of the seatback for supporting a shoulder blade of a vehicle occupant;
a head rest coupled with the upper portion of the main frame for supporting a head of the vehicle occupant; and
a sub-frame suspended from and coupled with the upper portion of the main frame and positioned such that the sub-frame is below the upper portion of the main frame at a level of the seatback for supporting a lumbosacral area of the vehicle occupant, the sub-frame comprising:
a first lateral member extending in a substantially vertical direction;
a second lateral member extending in the substantially vertical direction, the second lateral member being a separate and distinct element from the first lateral member, separated from the first lateral member by a distance in a width direction such that the second lateral member is free from direct physical contact with the first lateral member; and
a reinforcement member coupling the first lateral member with the second lateral member,
wherein
the sub-frame is coupled with the upper portion of the main frame such that the sub-frame is configured to swivel with respect to the upper portion of the main frame in a direction corresponding to a twisting motion of the vehicle occupant, and the reinforcement member is joined with the first lateral member at a plurality of first points, and with the second lateral member at a plurality of second points.

* * * * *